United States Patent [19]

Weirick

[11] Patent Number: 4,673,797

[45] Date of Patent: Jun. 16, 1987

[54] POWER CONTROL FOR HEATED WINDSHIELDS

[75] Inventor: Richard A. Weirick, Grandville, Mich.

[73] Assignee: Donnelly Corporation, Holland, Mich.

[21] Appl. No.: 792,131

[22] Filed: Oct. 28, 1985

[51] Int. Cl.[4] .............................................. H05B 1/02
[52] U.S. Cl. .................................... 219/203; 219/202; 219/491; 219/507; 219/508; 322/28; 320/64
[58] Field of Search ............... 219/490, 491, 492, 494, 219/202, 203, 483, 507–509; 320/64, 48, 99; 322/28, 29

[56] References Cited

U.S. PATENT DOCUMENTS

| | | | |
|---|---|---|---|
| 3,440,398 | 4/1969 | Nilssen | 219/202 |
| 3,469,073 | 9/1969 | Zechin | 219/202 |
| 3,525,853 | 8/1970 | Nilssen | 219/203 |
| 3,571,560 | 3/1971 | Nilssen | 219/202 |
| 3,576,970 | 5/1971 | Cherry | 219/202 |
| 3,585,358 | 6/1971 | Nilssen | 219/202 |
| 3,655,991 | 4/1972 | Schneider | 307/10 |
| 3,668,419 | 6/1972 | Cherry et al. | 219/202 |
| 3,676,694 | 7/1972 | Schneider et al. | 219/202 |
| 3,681,611 | 8/1972 | Watson | 307/10 |
| 3,770,976 | 11/1973 | Stroud et al. | 219/202 |
| 3,858,027 | 12/1974 | Phillips | 219/203 |
| 3,894,242 | 7/1975 | Helling | 322/99 |
| 3,898,423 | 8/1975 | Taylor et al. | 219/203 |
| 4,074,145 | 2/1978 | Laffoon et al. | 307/10 |
| 4,084,126 | 4/1978 | Clements | 219/202 |
| 4,239,978 | 12/1980 | Kofink | 219/202 |
| 4,267,433 | 5/1981 | Sahm, III | 219/491 |
| 4,277,672 | 7/1981 | Jones | 219/202 |
| 4,451,774 | 5/1984 | Akita et al. | 320/48 |

Primary Examiner—M. H. Paschall
Attorney, Agent, or Firm—Price, Heneveld, Cooper, DeWitt & Litton

[57] ABSTRACT

The specification discloses a vehicle electrical control system capable of switching the alternator output between a uniform standard voltage and a uniform higher voltage. The control system includes a supplemental voltage regulator and a switching circuit for selectively switching the supplemental regulator into the system to regulate the conventional voltage regulator. Preferably, the control system further includes a timing circuit for powering a plurality of electrically heated windows in a timed sequence.

18 Claims, 7 Drawing Figures

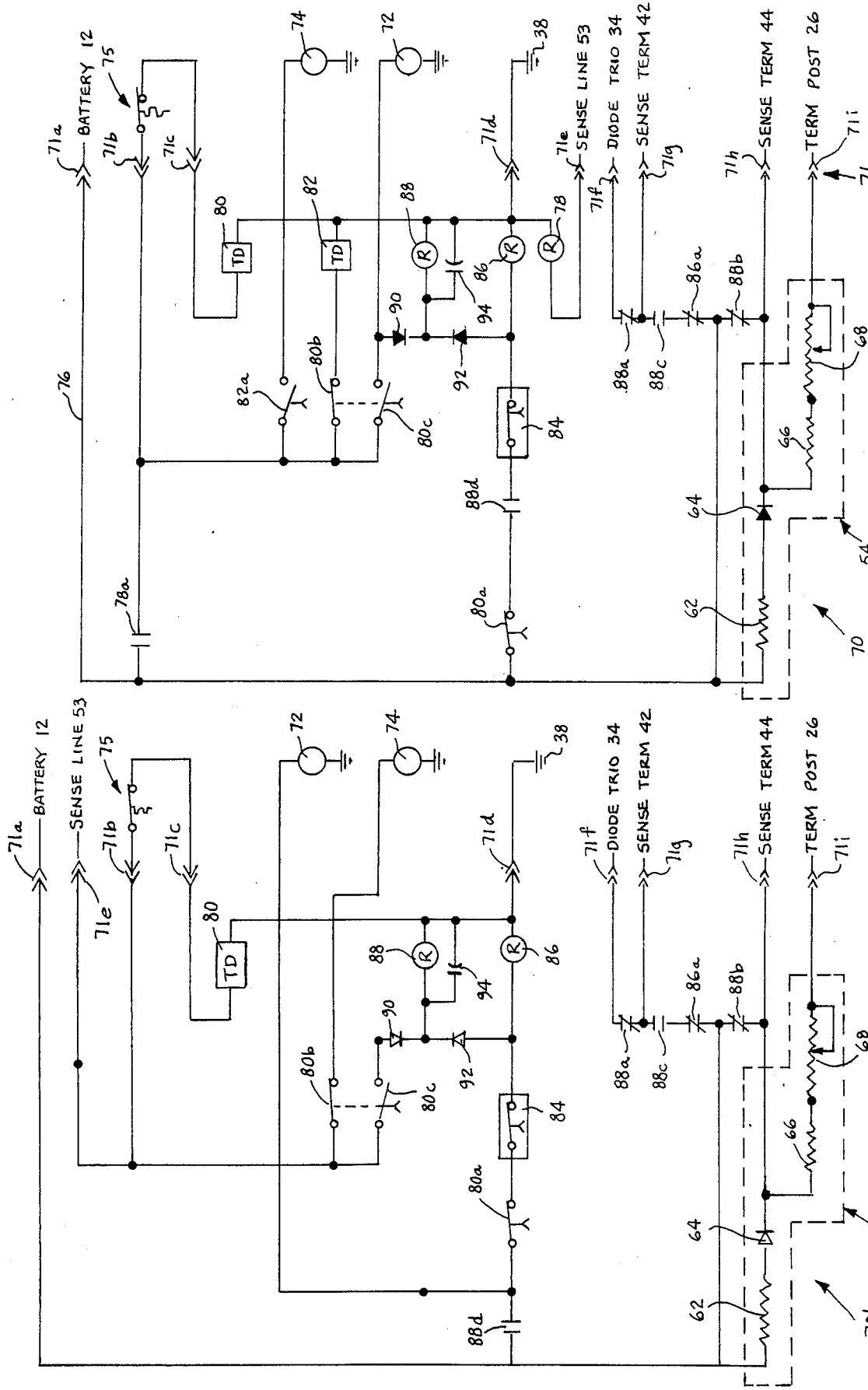

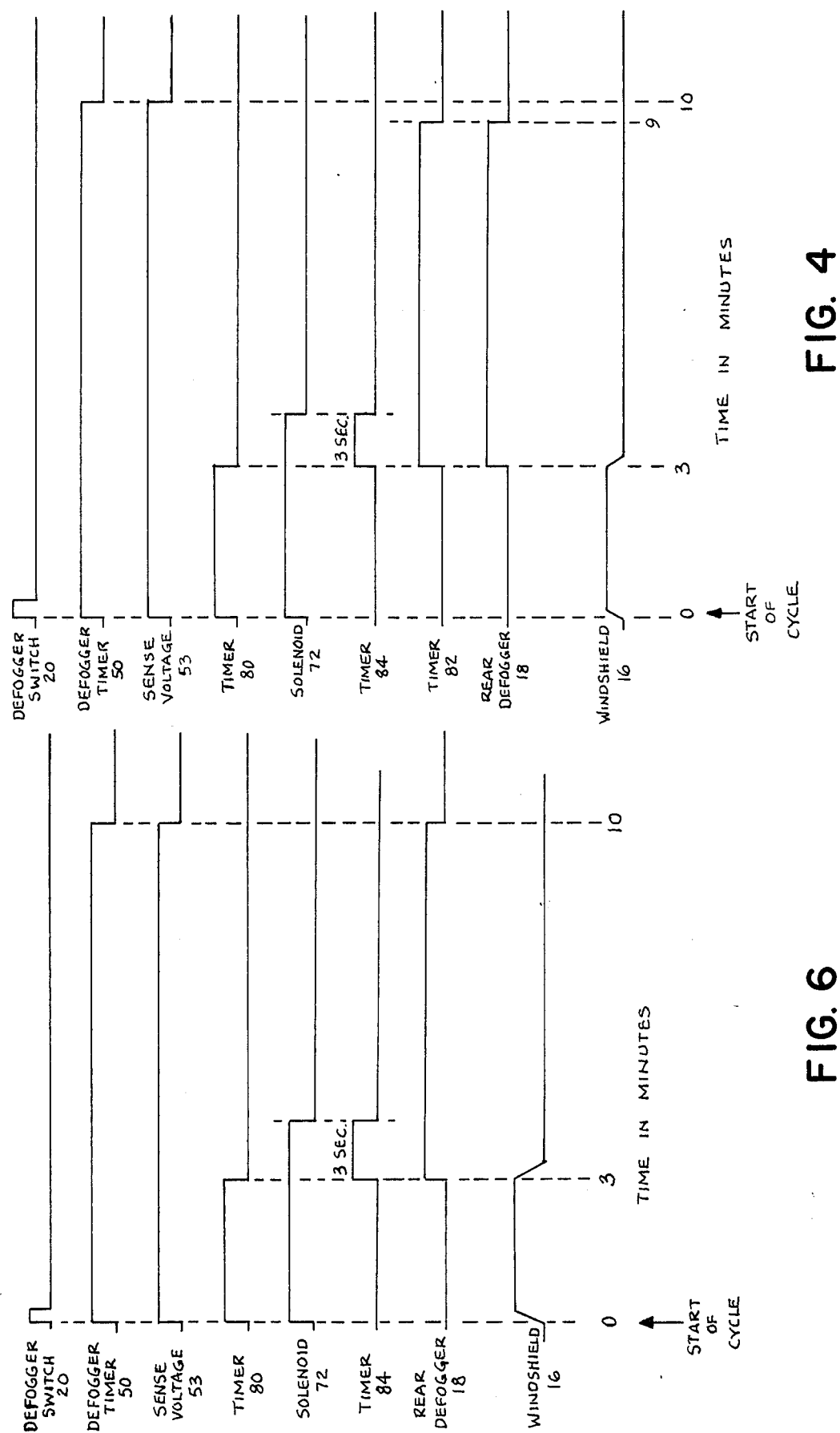

POWER CONTROL FOR HEATED WINDSHIELDS

BACKGROUND OF THE INVENTION

The present invention relates to power control systems for motor vehicles, and more particularly to such control systems for switching a vehicle alternator to a "high-voltage" mode to power a high-voltage accessory.

With increasing regularity, motor vehicles include accessories which require abnormally high voltages (i.e., in excess of 12 volts) for their operation. Such accessories include resistively heated windshields and windows, and resistively heated elements for heating the passenger compartment. Accordingly, a wide variety of power control systems has been developed for selectively operating the vehicle alternator to output an abnormally high voltage. Examples of such systems are shown in U.S. Pat. No. 4,074,145, issued Feb. 14, 1978, to Laffoon et al, entitled ELECTRIC POWER GENERATING APPARATUS; U.S. Pat. No. 3,676,694, issued July 11, 1972, to Schneider et al, entitled POWER OUTPUT ACCESSORY UNIT; and U.S. Pat. No. 4,267,433, issued May 12, 1981, to Sahm, entitled ELECTRICALLY HEATABLE WINDSHIELD HEATER CONTROL CIRCUIT.

Both the Laffoon and Schneider control systems are switchable between "standard" and "high-voltage" modes. In the standard mode, the field winding of the vehicle alternator receives an excitation voltage from the voltage regulator in conventional fashion to charge the battery and power the distribution system. In the high-voltage mode, the field winding receives an excitation voltage from the battery through a potentiometer or variable resistor to power only the high-voltage accessory. The potentiometer is manually adjustable, enabling the level of the higher alternator output voltage to be selected for a given engine speed. However, the high voltage varies with engine speed regardless of the potentiometer setting. Consequently, the Laffoon and Schneider control systems provide a varying voltage in the high-voltage mode. This is unacceptable in many commercial applications, wherein proper operation of the accessory is highly dependent on a uniform voltage level.

In the Sahm power control system, the high-voltage accessory—namely a heated windshield—can be selectively coupled in series between the alternator and the battery. A single voltage regulator assembly including a voltage divider maintains a constant standard voltage at the battery regardless of the voltage applied to the windshield. As with the Laffoon and Schneider power control systems, the high voltage applied to the windshield in the high-voltage mode, varies with engine speed. As pointed out above, this is unacceptable in many applications.

SUMMARY OF THE INVENTION

The aforementioned problems are overcome by the present invention wherein a vehicle power control system is selectively operable at a uniform "standard" voltage (i.e., 14 volts) or a uniform "higher" voltage, with both voltages being independent of engine speed. More particularly, the power control system includes a second, or regulate, voltage regulator and a switching circuit for selectively switching the second voltage regulator into a controlling relationship with the conventional voltage regulator. When the system is configured to output the standard voltage, the second voltage regulator is not switched into the system. In such configuration, the conventional voltage regulator maintains a uniform standard voltage independent of engine speed. In the high-voltage mode, the second voltage regulator is switched into a controlling relationship with the conventional voltage regulator to regulate or "fool" the conventional voltage regulator and cause the alternator to output an abnormally high, uniform voltage independent of engine speed. The second voltage regulator is responsive to the alternator output and steps the voltage down for application to the conventional voltage regulator. The present system outputs a uniform voltage in both the standard and high-voltage modes.

High-voltage accessories can be operated efficiently and accurately when powered by the uniform voltage provided by the present invention. When a heated windshield is the high-voltage accessory, the windshield can be driven at an optimal voltage to provide maximum defrosting without overpowering the windshield which might cause delamination of the resistive element from the glass. Therefore, the present invention enhances the operation of high-voltage accessories, contributing to both the safety and convenience of the motor vehicle.

These and other objects, advantages, and features of the invention will be more fully understood and appreciated by reference to the drawings and detailed description of the preferred embodiments.

BRIEF DESCRIPTION OF THE DRAWINGS

FIG. 3 is a schematic diagram of the timer logic control;

FIG. 4 is a timing diagram illustrating the operation of the timer logic control;

FIG. 5 is a schematic diagram of an alternative embodiment of the timer logic control;

FIG. 6 is a timing diagram illustrating the operation of the alternative timer logic control.

DETAILED DESCRIPTION OF THE PREFERRED EMBODIMENTS

First Embodiment

Figure 1:
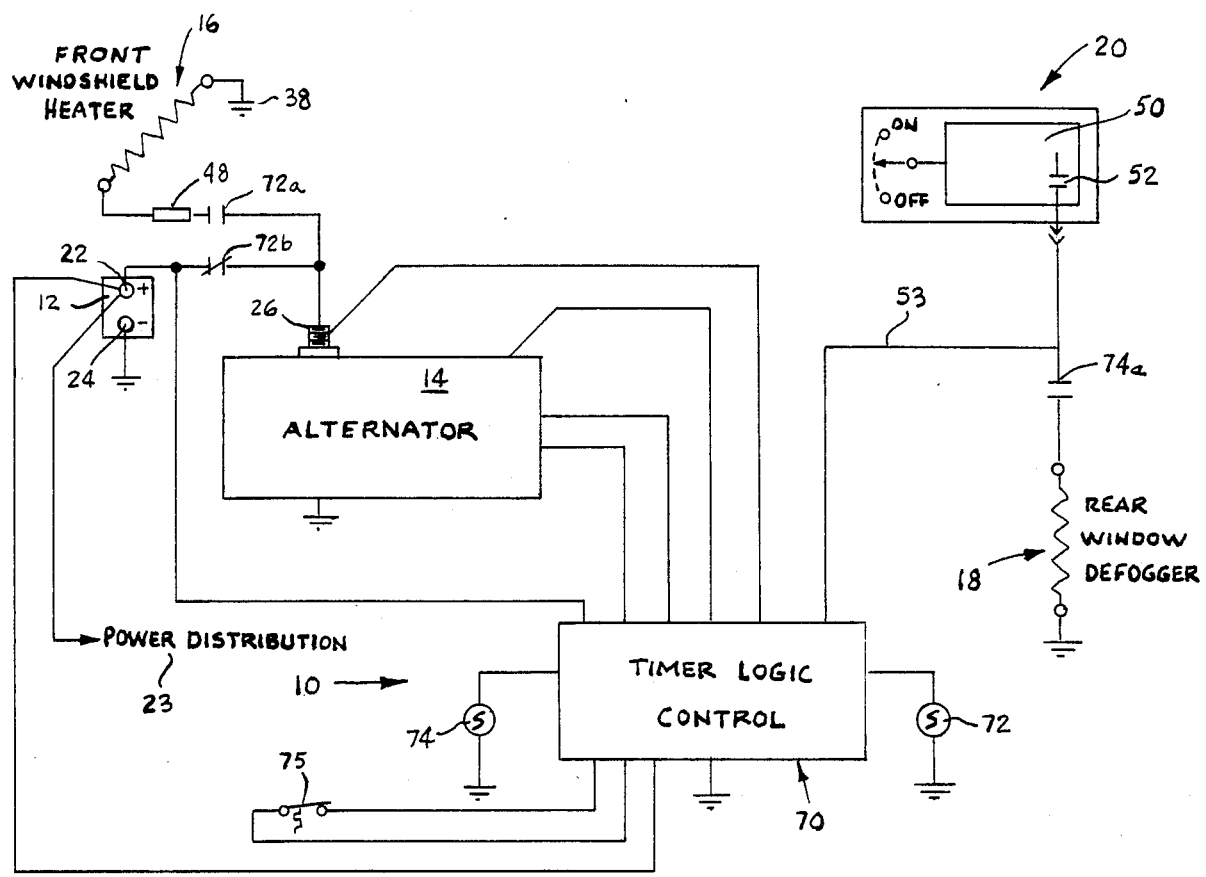
FIG. 1 is a schematic diagram of a vehicle electrical system including the power control of the present invention.

A first embodiment, and currently the preferred embodiment, of the power control of the present invention is illustrated in FIG. 1 and generally designated 10. The vehicle into which the control is incorporated includes a conventional battery or other storage device 12, a conventional alternator 14, a heated windshield 16, a rear window defogger 18, and a defogger switch 20.

The battery 12 (FIGS. 1 and 2) is a conventional 12-volt storage battery including a positive terminal 22 and a negative grounded terminal 24. The positive terminal is coupled to the vehicle's conventional power distribution system 23.

The alternator 14 (FIG. 2) includes a positive terminal post 26, a stator 28, a field winding or rotor 30, a rectifier bridge 32, a diode trio 34, and a voltage regulator 36. The alternator 14 is generally well-known to those having ordinary skill in the alternator art and will not be described in detail. The stator 28 is preferably connected in a "delta" configuration; alternatively, the stator can be connected in a "wye" configuration. Suffice it to say that the alternator generates a power output on terminal 26 through the rectifier bridge 32 which is coupled between ground 38 and the output terminal. The output terminal 26 is coupled to the positive terminal 22 of the battery 12 through the normally closed switch 72b. The rotor 30 rotates with respect to the stator 28 to induce current flow therein. The rotor 30 receives a variable excitation voltage from the voltage regulator 36 through slip-rings 40. The alternator 14 includes an auxiliary output terminal 42 coupled to the alternator output through the diode 34. The terminal 42 also serves as a first sense terminal for the regulator 36. The regulator 36 also includes a second sense terminal 44 which is conventionally coupled to the positive battery terminal 22 through the normally closed switch 88b. The voltage regulator operates in conventional fashion to provide an excitation voltage to the rotor 30 depending on the voltages sensed at terminals 42 and 44 to cause the output of the alternator 26 to be a constant or uniform 14 volts. For example, if the engine speed decreases, the voltage at terminal 42 drops; and the regulator increases the excitation voltage to maintain the output voltage at 14 volts.

The heated windshield 16 (FIGS. 1 and 2) is generally well-known to those having ordinary skill in the heated windshield art. For example, windshield 16 can be of the type wherein substantially the entire glass area is electrically resistively heated by a relatively high voltage, for example 90 volts. One such windshield is illustrated in U.S. Pat. No. 4,490,227, issued Dec. 25, 1984, to Bitter, entitled PROCESS FOR MAKING A CURVED CONDUCTIVELY COATED GLASS MEMBER AND THE PRODUCT THEREOF. The windshield 16 is coupled in series between the alternator output post 26 and ground 38. A fuse 48 and normally open switch 72a are coupled in series between the windshield 16 and the output terminal 26 of the alternator 14. A normally closed thermostatic switch 75 is mounted on the windshield and opens when the windshield temperature exceeds a maximum desired temperature, which in the preferred embodiment is 60 degrees F.

The rear window defogger 18 (FIG. 1) is also generally well-known to those having ordinary skill in the heated window art. Although the defogger can be any resistively heated element, typically the defogger comprises a network or grid of heater elements. The defogger switch 20 is a momentary, single-pole, double-throw switch spring-loaded to return to the center position. When the switch 20 is turned or pushed in one direction, a solid-state timer 50 is actuated to close relay contact 52. When the switch 20 is turned or pushed in the opposite direction, the timer 50 immediately stops and the relay 52 is opened. The timer 50 is a solid-state timer which energizes the relay contact 52 for a predetermined period of time, which in the first embodiment is ten minutes. The sense line 53 interconnects the relay 52 and the timer logic control 70.

A second voltage regulator 54 (FIG. 2) can be selectively switched into operation with the conventional voltage regulator 36. The second regulator 54 includes a first sense terminal 56, a second sense terminal 58, and an output terminal 60. When the system is operating in the standard mode, the normally closed switch 88b couples the sense terminal 44 with the positive battery post 22. When operating in the high-voltage mode, switch 88b is opened, as will be described; and the sense terminal 44 is coupled to the output terminal 60 of the second regulator 54. The first and second sense terminals 56 and 58 of the second regulator 54 are coupled to the positive battery post 22 and the alternator output post 26, respectively. The second regulator 54 includes a resistor 62 coupled in series with a diode 64 and a resistor 66 coupled in series with a rheostat 68. The side of the diode 64 opposite the resistor 62 and the side of the resistor 66 opposite the rheostat 68 are coupled to the output terminal 60. The rheostat 68 enables the second voltage regulator to be adjusted or "fine tuned" at the factory to insure a preselected high-voltage level when operating in the high-voltage mode.

Figure 2:
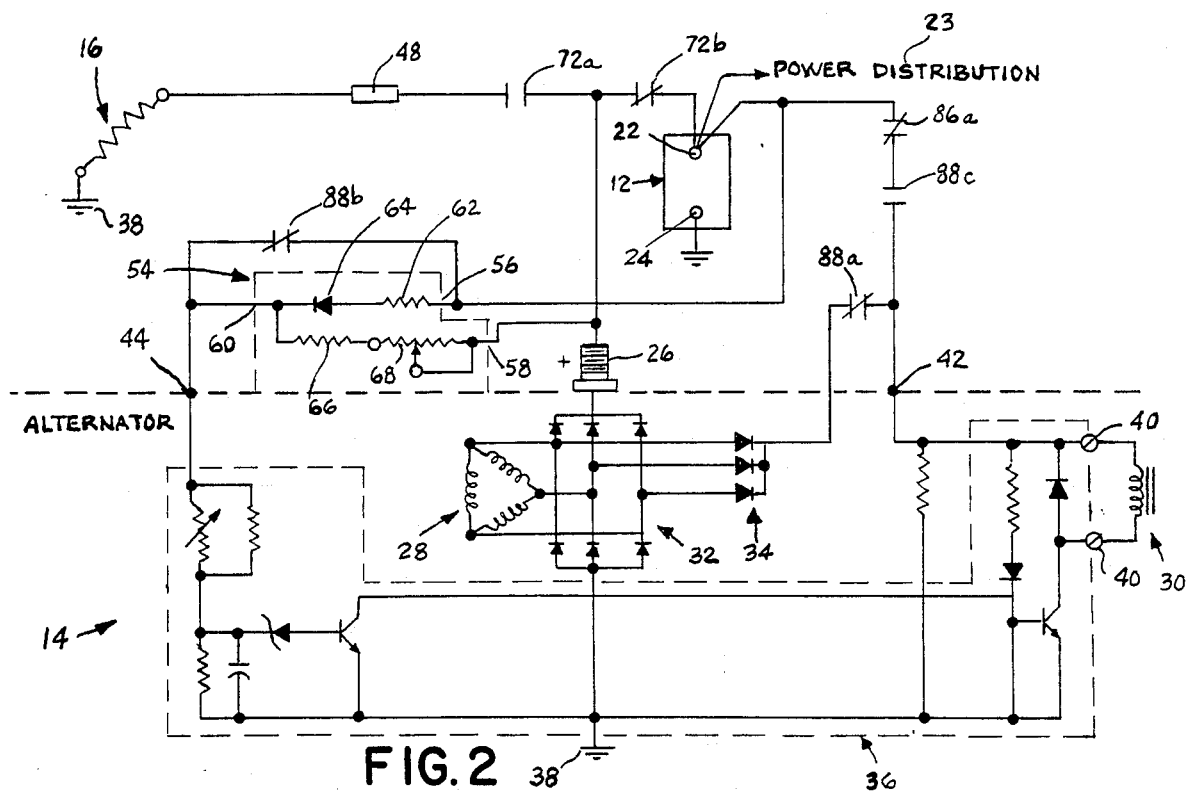
FIG. 2 is a detailed schematic diagram of the vehicle alternator, battery, and heated windshield, and the present power control.

Control for the system as thus far described is provided by the timer logic control 70 (FIG. 3). The control 70 includes a plurality of pins 71 for connecting the control to the remainder of the system. The control 70 also includes a pair of solenoids 72 and 74, both of which are grounded. Solenoid 74 controls switch 74a (FIG. 1), which is normally open and closes upon actuation of the solenoid 74. The solenoid 72 controls the operation of switches 72a and 72b (FIGS. 1 and 2). The switches 72a and 72b are normally open and closed, respectively, and change state when the solenoid 72 is actuated. Line 76 is coupled to the battery 12 through the pin 71a to provide power to the control 70. The thermostatic switch 75 is coupled in series between pins 71b and 71c. A normally open switch 78a is coupled in series between the pin 71b and the line 76 and is controlled by the relay 78.

A three-minute time delay 80 (FIG. 3) is coupled in series between the pin 71c and the ground pin 71d. The delay 80 controls normally closed switches 80a and 80b and normally open switch 80c. A six-minute time delay 82 is coupled in series with the normally closed switch 80b between the switch 78a and the grounded pin 71d. The delay 82 controls the normally open switch 82a, which is coupled in series between the switch 78a and the solenoid 74. The switch 80c is coupled in series between the switch 78a and the solenoid 72. A three-second time delay 84 is coupled in series with the switches 80a and 88d and the relay 86 between the power pin 71a and the grounded pin 71d.

The relay 78 (FIG. 3) is coupled in series between the sense line pin 71e and the grounded pin 71d and controls the switch 78a. The relay 86 is coupled between the time delay 84 and the grounded pin 71d. The relay 86 controls the operation of the normally closed switch 86a (FIGS. 2 and 3). The relay 88 is coupled in series with a diode 90 between the switch 80c and the grounded pin 71d. The relay 88 controls the operation of the normally closed switches 88a and 88b (FIGS. 2 and 3), the normally open switch 88c (FIGS. 2 and 3), and the normally open switch 88d (FIG. 3). The diode 92 is coupled in series between the time delay 84 and the relay 88. The capacitor 94 is coupled in parallel with the relay 88.

The connections of pins 71 are summarized as follows:

| Pin | Connection |
|---|---|
| 71a | battery 12 |
| 71b & 71c | thermostatic switch 75 |

| Pin | Connection |
| --- | --- |
| 71d | ground 38 |
| 71e | sense line 53 |
| 71f | diode trio 34 |
| 71g | sense terminal 42 |
| 71h | sense terminal 44 |
| 71i | terminal post 26 |

Operation of the First Embodiment

So long as the defogger switch 20 remains off, the control system 10 is configured to operate the vehicle electrical system at a standard 14-volt voltage. Specifically, the switches 72b (FIGS. 1 and 2), 86a, 88a, and 88b (FIGS. 2 and 3), and 80a and 80b (FIG. 3) all remain closed. The switches 72a (FIGS. 1 and 2), 74a (FIG. 1), 88c (FIGS. 2 and 3), and 78a, 80c, and 82a (FIG. 3) all remain open. The second voltage regulator 54 is short-circuited, or switched out of the system, by closed switch 88b (FIG. 2) such that the sense terminal 44 receives its voltage directly from the positive battery post 22. The output of the alternator at post 26 is applied through the closed switch 72b to the battery 12. The open switch 72a prevents power from being applied to the windshield 16. The sense terminal 42 receives a sense voltage from the diode trio 34 through the closed switch 88a. When thus configured, the alternator 14 and the conventional voltage regulator 36 operate in conventional fashion to regulate the output of the alternator at post 26 at 14 volts.

The high-voltage mode is initiated by actuating the defogger switch 20 (FIG. 1), whereupon the relay contact 52 closes, and 12-volt power is applied to the open switch 74a and the sense line 53. Because switch 74a is normally open, the power is not immediately applied to the defogger 18.

The operation of the timer logic control 70 in the high-voltage mode is best followed in FIG. 3. The power on sense line 53 energizes relay 78, which closes the normally open switch 78a. Power then flows from pin 71a through the switch 78a through the thermostatic switch 75 to the time delay 80. The time delay initiates a three-minute period during which normally closed switches 80a and 80b are opened and normally open switch 80c is closed. The closing of switch 80c actuates solenoid 72. The actuation of solenoid 72 closes normally open switch 72a (see FIGS. 1 and 2) to couple the windshield 16 to the alternator output 26. Also, the actuation of solenoid 72 opens normally closed switch 72b to disconnect the battery 12 and conventional power distribution system 23 from the alternator output 26. This protects the battery and the distribution system 23 from the abnormally high voltages generated by the alternator 14 in the high-voltage mode. The closing of switch 80c also actuates relay 88 which closes the normally open switch 88c (FIGS. 2 and 3) to couple the sense terminal 42 with the battery 12 through the normally closed contact 86a. Additionally, the actuation of solenoid 88 opens the normally closed switches 88a and 88b to disconnect the sense terminal 42 from the diode trio 34 and to disconnect the sense terminal 44 from the battery 12.

The control system 10 operates in this high-voltage configuration for three minutes as timed by the time delay 80. The output terminal 26 of the alternator 14 is coupled to the windshield 16 but not to the battery 12. The sense terminal 42 of the conventional voltage regulator is coupled to the battery 12 through the normally closed switch 86a and the switch 88c. The sense terminal 44 of the conventional regulator 36 is coupled to the output terminal 60 of the supplemental voltage regulator 54. As always, the first sense terminal 56 of the second voltage regulator 54 is coupled to the battery 12, and the second sense terminal 58 is coupled to the alternator output post 26.

In this high-voltage configuration, the second or supplemental voltage regulator 54 overrides or "fools" the conventional voltage regulator 36 to cause the alternator 14 to output an abnormally high voltage. In the preferred embodiment, the desired output voltage in the high-voltage mode is 90 volts. Consequently, the resistors 62 and 66 are selected and the rheostat 68 is adjusted so that an output voltage of 90 volts at the output terminal 26 and the sense terminal 58 causes the second regulator 54 to output a control voltage of 14 volts at the output terminal 60. The output of the second regulator 54 at terminal 60 is applied to the sense terminal 44 of the conventional regulator 36. When the output voltage exceeds 90 volts, the output of the second regulator 54 exceeds 14 volts, and the conventional voltage regulator 36 decreases the current in field winding or rotor 30. Similarly, if the output voltage at post 26 falls below 90 volts, the output of the second regulator 54 falls below 14 volts, and the conventional regulator 36 increases the current in the field winding 30. Consequently, the alternator output 26 is maintained at a uniform or constant high-voltage level independent of the engine speed.

The rheostat 68 (FIGS. 2 and 3) is manually adjustable to be preset at the factory, enabling the alternator output at post 26 in the high-voltage mode to be carefully preset. The adjustability provided by the rheostat 68 enables the output of the alternator to be selected within a range of 15 to 120 volts to permit each alternator to be "fine tuned" to the particular power demands of the windshield 16 or other high-voltage accessory.

For the purpose of the present application, it is assumed that a three-minute period of high-voltage operation is sufficient to defog and/or defrost the windshield 16. At the conclusion of the three-minute period as timed by the delay 80, the switches 80a and 80b return to their normally closed position and switch 80c returns to its normally open position. The opening of switch 80c deactuates solenoid 72, whereupon switch 72a opens and switch 72b closes to disconnect the windshield 16 from the power post 26 and to ready the battery 12 for reconnection to the alternator 14. The closing of the switch 80b initiates the six-minute delay period of timer delay 82. During this second delay period, normally open switch 82a is closed to actuate solenoid 74 and thereby close normally open switch 74a (see FIG. 1), applying the 14-volt power to the defogger 18.

The return of switch 80a to its normally closed position initiates a three-second time delay through the delay 84. During the switching initiated by the timing out of the delay 80, the relay 88 remains actuated by the charge stored on the capacitor 94. During the three-second delay, relay 86 is energized to open normally closed switch 86a, disconnecting the sense terminal 42 from the battery 12. The three-second delay provided by the delay 84 allows the abnormally strong magnetic field within the alternator to collapse before reconnecting the alternator 14 and regulator 36 in conventional fashion. When the three-second delay period terminates, relay 88 de-energizes to allow switches 88a and 88b to return to their normally closed position and switches 88c and 88d to return to their normally open condition. The opening of switch 88c disconnects the sense terminal 42 from the battery 12; the opening of switch 88d disconnects the delay 84; the closing of switch 88a reconnects the sense terminal 42 with the diode trio 34 (see also FIG. 2); and the closing of switch 88b reconnects the sense terminal 44 with the battery 12 (see also FIG. 2).

During the six-minute period initiated by timer delay 82, switch 82a is closed, actuating solenoid 74 and closing switch 74a to apply power to the defogger 18. The system operates at a standard 14-volt level, applying power to the defogger 18. At the conclusion of the six-minute period provided by time delay 82, switch 82a returns to its normally open position, deactuating solenoid 74 and opening switch 74a to interrupt power to the defogger 18. At this time, powering of both the windshield 16 and the rear window 18 is complete. When the defogger switch 20 completes its ten-minute timing cycle, relay 52 will open without further consequence to the rear defogger 18 or the timer logic control 70.

The thermostatic switch 75 mounted on the windshield 16 interrupts the timer delay 80 (FIG. 3) to terminate the high-voltage mode if the windshield temperature is excessive. This prevents power from being applied to the windshield before the windshield approaches a delamination temperature.

The operation of system 10 is illustrated in FIG. 4 which is a timing diagram for the defogger switch 20, the defogger timer 50, the sense line voltage 53, the timer 80, the solenoid 72, the timer 84, the timer 82, the rear defogger 18, and the windshield 16. At time "0", the defogger switch 20 is actuated and the defogger timer begins its ten-minute timing sequence, during which time the sense voltage 53 remains high. The timer 80 within the control 70 times a three-minute period beginning at time "0" and then deactuates. The solenoid 72 remains actuated while either of the timers 80 and 84 are active. The timer 84 actuates during a three-second period after the three-minute period provided by the timer 80. The timer 82 provides a six-minute timing interval initiated after the three-minute period of the timer 80. The rear defogger 18 is powered while the timer 82 is active. The windshield 16 is powered during the three-minute period of delay 80.

Second Embodiment

An alternative embodiment 70' of the timer logic control 70 is illustrated in FIG. 5. The primary difference between the alternative embodiment 70' and the first embodiment 70 is that the timer delay 82 and the associated switch 82a are not included in the second embodiment. Corresponding elements between FIGS. 3 and 5 are numbered identically. No new elements appear in FIG. 5 which are not present in FIG. 3.

Operation of the Second Embodiment

The operation of the alternative control 70' of FIG. 5 is generally similar to that of embodiment 70 of FIG. 3 with the exception that the rear window defogger 18 times out under the control of the defogger switch 20 rather than the timer delay 82. Specifically, the actuation of the defogger switch 20 (see FIG. 1) applies power through the sense line 53 and the thermostatic switch 75 to the timer delay 80. The actuation of the timer delay 80 opens the normally closed switches 80a and 80b and closes the normally open switch 80c. Consequently, power is applied through the switch 80c and the diode 90 to the relay 88, which closes the normally open switches 88c and 88d and opens the normally closed switches 88a and 88b. The opening of the switch 88a disconnects the sense terminal 42 from the diode trio 34; the opening of the switch 88b disconnects the sense terminal 44 from the battery 12; the closing of switch 88c connects the sense terminal 42 with the battery 12 through the normally closed switch 86a; and the closing of switch 88d actuates solenoid 72. The actuation of solenoid 72 in turn closes normally open switch 72a and opens normally closed switch 72b to connect the windshield 16 to the alternator output post 26 and to disconnect the battery 12 therefrom.

When in this high-voltage configuration, the second voltage regulator 54 overrides or fools the conventional voltage regulator to cause the alternator 14 to output a uniform abnormally high voltage.

After the three-minute period provided by time delay 80, switches 80a and 80b return to their normally closed positions and switch 80c returns to its normally open position. The closing of the switch 80a applies power to the relays 86 and 88 through the time delay 84. The capacitor 94 is provided to power the relay 88 in the transitional period while the switch 80a is closing and the switch 80c is opening. Actuation of the relay 86 opens the normally closed switch 86a to disconnect the sense terminal 42 from the battery 12, permitting the field within the alternator to collapse. After the three-second period of delay 84, relays 86 and 88 are deactuated to return the system 10 to its conventional configuration. The closing of the switch 80b actuates the solenoid 74 to close the normally open switch 74a (see also FIG. 1) and thereby apply power to the rear window defogger 18. When the defogger timer times out, the defogger relay 52 opens to terminate power to the defogger 18; the sense voltage on line 53 terminates; solenoid 74 is deactuated; and switch 74a returns to its normally open position.

As in the previously described embodiment, the thermostatic switch 75 provides overheat protection for the windshield 16 to terminate the high-voltage mode when an excessive temperature is detected.

The operation of the second embodiment 70' is illustrated in FIG. 6, which is a timing diagram for the defogger switch 20, the defogger timer 50, the sense line voltage 53, the timer 80, the solenoid 72, the timer 84, the rear defogger 18, and the windshield 16. Actuation of the defogger switch 20 at time "0" initiates a ten-minute timing period on the defogger timer, during which time the sense voltage 53 also remains high. At time "0", timer 80 is also initiated to time a three-minute period followed by a three-second period provided by timer 84. The solenoid 72 is actuated whenever either of the timers 80 and 84 is active. The rear defogger is powered for seven minutes from the conclusion of the three-minute timing period of timer 80 to the end of the ten-minute timer period of the defogger timer 50. The windshield 16 is powered during the three-minute timing period provided by timer 80.

The preferred and second embodiments of the present invention provide control systems which enable an alternator to be selectively operated in standard and high-voltage modes and wherein the alternator output is uniform or constant in both modes. Consequently, the output of the alternator is not dependent upon engine speed. The constant voltage provided by the alternator in the high-voltage mode enables high-voltage accessories to be accurately and precisely powered to provide optimal performance.

Modification of the Heated Windshield and Its Connection to the Alternator

Figure 7:
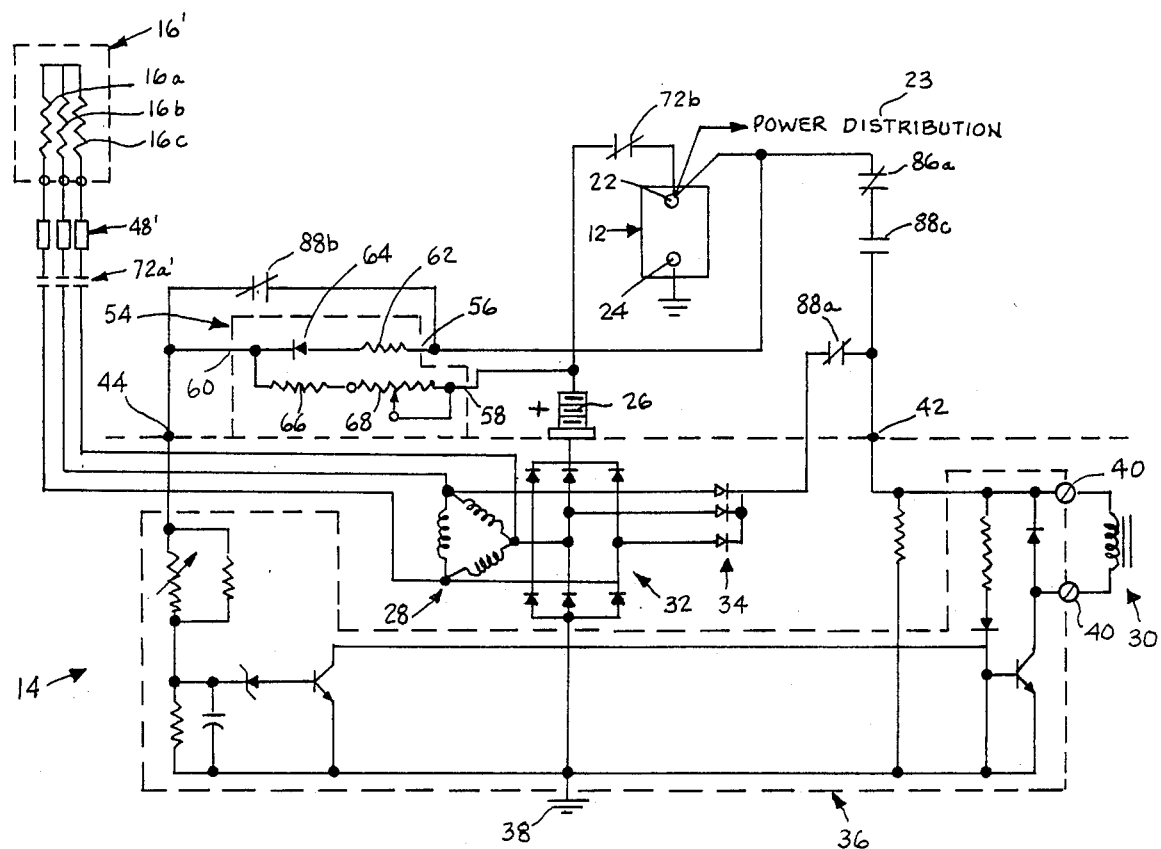
FIG. 7 is a detailed schematic diagram similar to FIG. 2 showing an alternative interconnection of a heated windshield and the vehicle alternator.

An alternative embodiment 16' of the windshield heater is illustrated in FIG. 7. Corresponding elements between FIGS. 2 and 7 are numbered identically. Only those elements which differ from FIG. 2 will be described.

The alternative heater 16' includes three separate resistively heated elements 16a, 16b, and 16c. These elements can comprise three separate resistive coatings on a common windshield or three separate resistive elements on separate windows. The three elements 16a, 16b, and 16c are connected to form a phase-balanced resistive load. Each element is protected through its respective fuse 48' and is connected to one of the stator 28 windings through its respective normally open switch 72a'. The three switches 72a' operate in parallel identically to switch 72a described in conjunction with the preferred embodiment.

Powering of the alternative windshield heater 16' is generally analogous to that previously described in conjunction with the preferred and second embodiments. The primary difference is that the heater 16' is A.C. powered as a phase-balanced load, while the windshield heater 16 is powered as a D.C. load.

The above descriptions are those of preferred embodiments of the invention. Various alterations and changes can be made without departing from the spirit and broader aspects of the invention as defined in the appended claims, which are to be interpreted in accordance with the principles of patent law, including the doctrine of equivalents.

The embodiments of the invention in which an exclusive property or privilege is claimed are defined as follows:

1. An electrical control system for an automotive vehicle including a battery; an alternator having a field winding; a first voltage regulator coupled to the battery, the alternator output, and the alternator field winding for regulating the alternator output at a first regulated uniform voltage; and a high-voltage accessory, said control system comprising:
    a second voltage regulator;
    switching means actuable for operatively coupling said second voltage regulator to the battery, the alternator output; and the first voltage regulator to cooperate with the first voltage regulator to regulate the alternator output at a second regulated uniform voltage higher than the first voltage to power the high-voltage accessory; and
    protective means for operatively disconnecting the battery from the alternator output when said switching means is actuated to protect the battery from the second higher voltage.

2. A control system as defined in claim 1 wherein said switching means includes timer means for deactuating said switching means a first period of time after actuation of said switching means.

3. A control system as defined in claim 1 further comprising a normally closed thermostatic switch mounted on the high-voltage accessory, said switching means being responsive to said thermostatic switch to deactuate when the temperature of said high-voltage accessory is excessive.

4. A control system as defined in claim 1 wherein the high-voltage accessory includes a plurality of resistive loads connected to the alternator as a phase-balanced load.

5. A vehicle electrical system including:
    a battery;
    an alternator;
    a high-voltage accessory;
    switching means for selectively coupling said battery to the alternator output, said switching means being actuable between a first state wherein said battery is coupling to the alternator output and a second state wherein said battery is not coupled to the alternator output;
    voltage regulator means for regulating the alternator output and actuable between a first state wherein the alternator output is regulated at a first regulated uniform voltage and a second state wherein the alternator output is regulated at a second regulated uniform voltage higher than the first voltage; and
    control means for coordinating actuation of said switching means and said voltage regulator means to their first states and to their second states, whereby said battery receives the first voltage when said switching means and said regulator means are in their first states, and further whereby only said high-voltage accessory receives the second higher voltage when said switching means and said regulator means are in their second states.

6. An electrical system as defined in claim 5 wherein said control means includes timer means for timing a period of time, said control means actuating said switching and regulator means to their second states only during said period of time.

7. An electrical system as defined in claim 5 further comprising a thermostatic switch mounted on said high-voltage accessory, said control means being responsive to said thermostatic switch to terminate the second high voltage if the temperature of said high-voltage accessory is undesirable.

8. An electrical system as defined in claim 5 wherein said high-voltage accessory includes a plurality of resistive elements connected to said alternator as a phase-balanced load.

9. An electrical system as defined in claim 5 wherein said high-voltage accessory is disconnected from said alternator output when said switching means is in the first state and is connected to said alternator output when said switching means is in the second state.

10. An electrical system as defined in claim 5 wherein said voltage regulator means includes first and second voltage regulators, only said first regulator being operative when said regulator means is in the first state, both said first and second regulators being operative when said regulator means is in the second state.

11. An electrical system as defined in claim 10 wherein said second voltage regulator is factory adjustable enabling the high-voltage level to be factory preset.

12. An electrical control system for an automotive vehicle including a battery, a power distribution system, a high-voltage accessory, and an alternator for providing power to the battery and power distribution system, the alternator including a first voltage regulator having a pair of sense terminals coupled to the battery and alternator output for regulating the alternator field current to maintain a uniform conventional alternator output voltage, said control system comprising:

a second voltage regulator including a pair of sense terminals and an output terminal;

first switching means actuable to a high-voltage state wherein (1) one of the sense terminals on each of said regulators is coupled to said battery, (2) the other of said second regulator sense terminals is coupled to the alternator output, and (3) the other of the first regulator sense terminals is coupled to said second regulator output terminal, whereby said second regulator overrides the first regulator in said high-voltage state causing the alternator to output a uniform relatively high voltage to power the high-voltage accessory; and second switching means for operatively disconnecting the battery and power distribution system from the alternator output during actuation of said first switching means to the high-voltage state.

13. A control system as defined in claim 12 further comprising control means for actuating said first switching means, said control means including timer means for causing said first switching means to remain actuated only for a period of time.

14. A control system as defined in claim 13 wherein said control circuit further includes second timer means for deactuating said second switching means a second period of time after deactuating said first switching means, thereby permitting the high-voltage field within the alternator to collapse during the second period of time.

15. A control system as defined in claim 12 wherein said second regulator is factory adjustable whereby the level of the uniform high voltage can be factory preset.

16. A control system as defined in claim 12 further comprising a temperature-sensitive switch mounted on said high-voltage accessory, and wherein said switching means is responsive to said temperature-sensitive switch to deactuate when the accessory temperature is undesirable.

17. A control system as defined in claim 12 wherein the high-voltage accessory includes a plurality of loads connected to the alternator as a phase-balanced load.

18. An electrical control system for an automotive vehicle including an alternator operable at either a standard voltage or a higher voltage, and first and second electrically heated window elements operable at the higher and standard voltages, respectively, said control system comprising:

first switching means actuable for causing the alternator to output the higher voltage to the first window element;

second switching means actuable for causing the alternator to output the standard voltage to the second window element; and control means for controlling said first and second switching means, said control means including first timer means for actuating said first switching means for only a first period of time to provide the higher voltage to the first window element, said control means further including second timer means for actuating said second switching means for only a second period of time following the first period of time to provide the standard voltage to the second window element.

* * * * *

UNITED STATES PATENT AND TRADEMARK OFFICE
CERTIFICATE OF CORRECTION

PATENT NO. : 4,673,797

DATED : June 16, 1987

INVENTOR(S) : Richard A. Weirick

It is certified that error appears in the above-identified patent and that said Letters Patent is hereby corrected as shown below:

Claim 5, Column 10, line 14:
           "coupling" should be --coupled--.

Signed and Sealed this

Third Day of November, 1987

*Attest:*

DONALD J. QUIGG

*Attesting Officer*      *Commissioner of Patents and Trademarks*